(12) United States Patent
Archambeau et al.

(10) Patent No.: US 10,698,364 B2
(45) Date of Patent: Jun. 30, 2020

(54) METHODS AND SYSTEMS FOR AUGMENTED REALITY

(71) Applicant: Essilor International, Charenton-le-Pont (FR)

(72) Inventors: Samuel Archambeau, Charenton-le-Pont (FR); Jerôme Ballet, Charenton-le-Pont (FR); Aude Bouchier, Charenton-le-Pont (FR); Jean-Paul Cano, Charenton-le-Pont (FR); David Escaich, Charenton-le-Pont (FR); Stephane Perrot, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 593 days.

(21) Appl. No.: 14/916,835

(22) PCT Filed: Sep. 3, 2014

(86) PCT No.: PCT/EP2014/068754
§ 371 (c)(1),
(2) Date: Mar. 4, 2016

(87) PCT Pub. No.: WO2015/032824
PCT Pub. Date: Mar. 12, 2015

(65) Prior Publication Data
US 2016/0223986 A1    Aug. 4, 2016

(30) Foreign Application Priority Data

Sep. 4, 2013    (EP) ..................................... 13306207

(51) Int. Cl.
*G03H 1/02*    (2006.01)
*G03H 1/00*    (2006.01)
(Continued)

(52) U.S. Cl.
CPC ....... *G03H 1/0005* (2013.01); *G02B 27/0093* (2013.01); *G02B 27/017* (2013.01);
(Continued)

(58) Field of Classification Search
CPC ........ G02B 27/0172; G02B 2027/0178; G02B 2027/0174; G02B 2027/014;
(Continued)

(56) References Cited

U.S. PATENT DOCUMENTS

2009/0172497 A1* 7/2009 Kim ..................... G06F 11/1076
714/763
2010/0271675 A1* 10/2010 Leister ..................... G03H 1/08
359/9

(Continued)

FOREIGN PATENT DOCUMENTS

WO    WO 2013/057923    4/2013

*Primary Examiner* — Amit Chatly
(74) *Attorney, Agent, or Firm* — Oblon, McClelland, Maier & Neustadt, L.L.P.

(57) ABSTRACT

Methods and systems (terminals, devices) for the generation, the retrieval and the display of computer-generated holographic images through a head-mounted display. The holographic images may be used as virtual retrievable tags for display in augmented reality.

12 Claims, 4 Drawing Sheets

(51) Int. Cl.
*G03H 1/22* (2006.01)
*G06F 3/01* (2006.01)
*G02B 27/01* (2006.01)
*G02B 27/00* (2006.01)
*G06F 3/0482* (2013.01)
*G06F 3/0484* (2013.01)
*G06F 3/0488* (2013.01)
*G02C 7/14* (2006.01)
*G02C 7/08* (2006.01)

(52) U.S. Cl.
CPC .......... *G02B 27/0172* (2013.01); *G03H 1/02* (2013.01); *G03H 1/2286* (2013.01); *G03H 1/2294* (2013.01); *G06F 3/011* (2013.01); *G06F 3/012* (2013.01); *G06F 3/013* (2013.01); *G06F 3/0482* (2013.01); *G06F 3/04842* (2013.01); *G06F 3/04883* (2013.01); *G06F 3/04886* (2013.01); *G02B 2027/014* (2013.01); *G02B 2027/0174* (2013.01); *G02B 2027/0178* (2013.01); *G02C 7/086* (2013.01); *G02C 7/14* (2013.01); *G02C 2202/20* (2013.01); *G03H 2001/0061* (2013.01); *G03H 2001/0228* (2013.01); *G03H 2001/2242* (2013.01); *G03H 2001/2284* (2013.01); *G03H 2226/04* (2013.01); *G03H 2227/02* (2013.01); *G03H 2270/55* (2013.01)

(58) Field of Classification Search
CPC . G02B 2027/011; G06T 19/006; G02C 7/027; G02C 7/14; G02C 2202/20; G02C 7/086; G03H 1/0808; G03H 1/2294; G03H 2225/60
USPC .................................. 345/156–178
See application file for complete search history.

(56) References Cited

U.S. PATENT DOCUMENTS

| | | | |
|---|---|---|---|
| 2011/0270522 A1 | 11/2011 | Fink | |
| 2012/0212484 A1* | 8/2012 | Haddick | G02B 27/0093 345/419 |
| 2013/0241806 A1* | 9/2013 | Bathiche | G02B 27/0179 345/8 |
| 2013/0265622 A1* | 10/2013 | Christmas | G02B 27/0103 359/9 |
| 2014/0282911 A1* | 9/2014 | Bare | G06T 19/006 726/4 |
| 2015/0355481 A1* | 12/2015 | Hilkes | G02B 27/017 351/204 |

\* cited by examiner

METHODS AND SYSTEMS FOR AUGMENTED REALITY

RELATED APPLICATIONS

This is a U.S. national stage application under 35 USC § 371 of International application No. PCT/EP2014/068754, filed on Sep. 3, 2014. This application claims the priority of European application no. 13306207.5 filed Sep. 4, 2013, the entire content of which is hereby incorporated by reference.

FIELD OF THE INVENTION

The invention relates to systems and methods for augmented reality.

The invention relates more particularly to the generation, the retrieval and the display of computer-generated holographic images through a head-mounted display (HMD).

BACKGROUND OF THE INVENTION

Head-mounted devices with display features are known in the art. Such devices include so-called 'smart glasses', which allow the wearer thereof to visualize images or text for augmented reality.

In order to improve wearer visual comfort, it is desirable to provide methods and systems wherein images and text are displayed in a customized way that is specifically adapted to the wearer and/or to the worn device.

Further, in order to improve wearer ergonomic comfort, it is desirable to provide a head-mounted device that is light, compact, and in particular a device that has low energy requirements when in use.

Also, with regards to safety, certain types of electromagnetic waves used in communication for data exchange may create health issues, especially for devices located close to the head, such as HMDs. It is thus desirable to provide a head-mounted device whose functioning limits or avoids exposure of the wearer to such electromagnetic waves.

SUMMARY OF THE INVENTION

The present invention generally provides methods and systems for computer-generated holographic image display with a head-mounted device.

In some aspects, the present invention provides methods and systems for the retrieval and display of computer-generated holographic images. In other aspects, the present invention provides methods and systems for the creation of computer-generated holographic images, wherein said holographic images can be made available for subsequent retrieval and display.

According to the invention, the quality of the display and the wearer visual experience can be enhanced by correcting image distortions due to optical aberrations. Such aberrations may result from the geometry and design of the device.

In preferred embodiments, the invention implements computer-generated holographic image display by means of a phase spatial light modulator (SLM). Said SLM can be selected from phase-only SLMs and phase and amplitude SLMs. Phase-coding of computer-generated holographic images is very advantageous in terms of energy consumption and image quality, and provides further advantages as described hereinafter.

Methods of the Invention

One aspect of the present invention provides a computer-implemented method for the processing of computer-generated holographic image data. Said method comprises:

(a) a step of detecting, by at least one communication terminal, the presence of a wearer provided with a head-mounted computer-generated holographic image displaying device; and (b) responsive to the presence detected at step (a), a step of transmitting computer-generated holographic image data from one of said device and said communication terminal, to the other of said device and said communication terminal.

Step (b) may comprise transmitting said computer-generated holographic image data through optical communication.

The method of the invention may also comprise:

(c) a step of emitting, by at least one light source, a light beam suitable (arranged, configured) for displaying the holographic image by illumination of said device, wherein said light source is provided on at least one remote lighting terminal and/or is built-in on said device.

Where said light source is provided on said communication terminal, step (b) may comprise transmitting said computer-generated holographic image data from said light source to said device.

Said at least one communication terminal and/or said at least one lighting terminal may be connected to a server via a network.

According to a first embodiment of the method of the invention, step (b) may be a step of transmitting said computer-generated holographic image data from said communication terminal to said device.

In this first embodiment, step (b) may comprise the step of sequentially transmitting computer-generated holographic image data from a plurality of distant communication terminals to said device, wherein each of said communication terminals is connected to a communication server via a communication network and wherein the sequential emission reflects the successive detection steps of the presence of the wearer from the vicinity of one communication terminal to the vicinity of another communication terminal, defining a movement of said wearer as a function of time.

In this first embodiment, the method of the invention may further comprise:

(a2) a step of determining the location of said wearer, wherein the computer-generated holographic image data of step (b) are defined according to the location determined at step (a2).

In this first embodiment, the method of the invention may further comprise:

(d) a step of detecting a movement of the wearer, and
(e) as a function of the recognition of the movement of step (d), a step of generating a control signal for the selection of further computer-generated holographic image data to be transmitted from said communication terminal to said device.

According to a second embodiment, the method of the invention comprises:

(i) a step of detecting a movement of a wearer provided with a head-mounted computer-generated holographic image displaying device, and (ii) as a function of the recognition of the movement of step (i), a step of acquiring image data, and step (b) is a step of transmitting computer-generated holographic image data from said device towards said communication terminal.

In this second embodiment, step (ii) may comprise one or more selected from selecting an option from a menu, entering at least one key on a virtual keyboard, hand-writing on a virtual note pad, and taking a digital picture.

In this second embodiment, said at least one communication terminal may be connected to a communication server via a network and the data of step (b) may be stored in a communication database, optionally in association with a location.

In general terms (including first and second embodiments), the method of the invention may further comprise (a1) a preliminary step of pre-registering, in a database, an association between an identifier and said wearer, wherein the data of step (b) are defined according to said identifier, optionally in accordance with access rights.

Systems and Devices of the Invention

Another aspect of the present invention provides a lighting terminal, comprising:
  a light source suitable (arranged, configured) for displaying a holographic image by illumination,
  a sensor suitable (arranged, configured) for detecting the presence of a wearer provided with a head-mounted computer-generated holographic image displaying device, and
  optionally, a communication interface suitable (arranged, configured) for transmitting computer-generated holographic image data from and/or to said lighting terminal.

This lighting terminal is suitable (arranged, configured) for the implementation of the method of the invention.

Another aspect of the present invention provides a system comprising a plurality of lighting terminals as described herein, wherein each of said lighting terminals is connected to a lighting server via a lighting network. Such system is suitable (arranged, configured) for the implementation of the method of the invention.

Another aspect of the invention provides a head-mounted computer-generated holographic image displaying device comprising:
  a communication interface suitable (arranged, configured) for transmitting computer-generated holographic image data from and/or to said device,
  a phase spatial light modulator, for example a phase-only or a phase and amplitude spatial light modulator, for example made of LCoS (liquid crystal on silicon) or Glass transmissive Active Matrix Liquid Crystal, and
  optionally, a light source suitable (arranged, configured) for displaying a holographic image upon illumination, wherein the illumination includes the illumination of the SLM; i.e the light source is suitable (arranged, configured) for illuminating so as to display a holographic image.

This device is suitable (arranged, configured) for the implementation of the method of the invention.

DEFINITIONS

The following definitions are provided to describe the present invention.

"Computer-generated holographic images" are known in the art. Such holographic images can be displayed by reading (illuminating) computer-generated holograms. Computer-generated holograms are also referred to as synthetic or digital holograms. Computer-generated holograms are generally obtained by selecting a 2D or 3D image, and digitally computing a hologram thereof. The holographic image can be displayed by optical reconstruction, namely by illuminating (reading) the hologram with a suitable (arranged, configured) light beam (reference beam of the hologram). The image may be 'real' in that it may be displayed on a physical screen or support, or 'aerial' (virtual). The hologram may be printed onto a holographic support or implemented on an SLM as explained thereafter.

Figure 5:
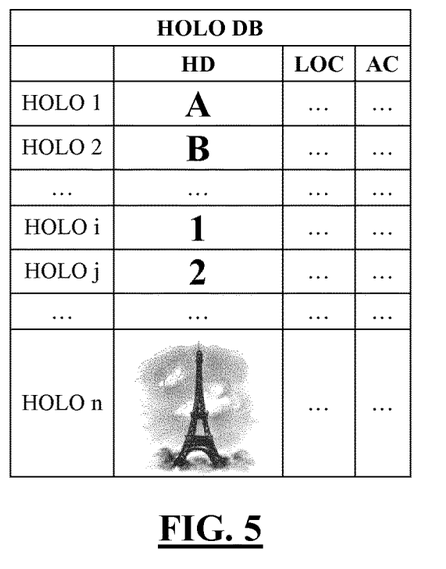
FIG. 5 shows the structure of an exemplary database useful in the method of the invention.

"Computer-generated holographic image data" HD are known in the art. They generally comprise coded data (set(s) of coded data) that allow for the display of a computer-generated holographic image for visualization by a subject. Computer-generated holographic image data include data that code for the computer-generated holographic image itself (its "content", which can be a picture, an alphanumerical character and combinations thereof, etc.), including for each pixel of the image (2D, 3D), information about the phase and amplitude. Computer-generated holographic image data may also further include data coding for the position (location) of the display of the holographic image in the vision field of the wearer (for example with reference to the frame of the device HMD) and/or for the size of the holographic image to be visualized (zoom or enlargement) and/or for the location of the focus plan of the holographic image to be visualized. Such data for holographic image location, size and focus plan are especially useful for display of the holographic image on a device HMD provided with a built-in light source. When the device HMD is not provided with a built-in light source, namely when the light source is remote from the device HMD, one may consider that the data for location and focus plan are implicitly included in the computer-generated holographic image data. Said data may however further comprise data for the size of the image (e.g. for zooming). Computer-generated holographic image data may also provide for several images to be displayed, for example for multiplex display. Computer-generated holographic image data may provide for an image in one color (for example, black and white), or in more than one color, for example using at least three colors, for example the three primary colors. The data that code for the computer-generated holographic image itself (its "content") are advantageously phase-coded. The data HD can be decoded and transmitted to displaying means, for example to an SLM, for allowing reading of the hologram and display of the corresponding holographic image upon suitable (arranged, configured) illumination. According to the invention, said data HD can be stored in a memory of the HMD and/or in a memory on a terminal such as a communication terminal COM TERM and/or in a database accessible via a server such as a communication server COM SERV. Sets of holographic image data HD can be stored in a holographic image database of computer-generated holographic image data HOLO DB. Said database DB comprises a memory suitable (arranged, configured) for storing and retrieving sets of holographic image data and can be part of a server such as communication server COM SERV, or connected to the server via a communication network COM NETW. An example of a structure of computer-generated holographic image database is shown on FIG. 5. FIG. 5 illustrates an example of a database HOLO DB comprising computer-generated holographic image data HD. The holographic images can be alpha-numerical characters (letters "A", "B", etc.; numbers "1", "2", etc.) or more complex images such as pictures. The data may include location LOC of the image in the vision field of the wearer. Further, sets of data may be defined in accordance with access rights AC. On FIG. 5, each set of computer-generated holographic image data HD can for example be retrieved form the database using an identifier (HOLO i). The data HD can be a set of data. The data may correspond to a content such as an image and/or text. The data may also correspond to a menu of options, in the form of text portions and/or icons.

"Servers" SERV are known in the art. A server SERV may be connected via an extended network NETW to a plurality of terminals TERM. The network NETW allows for data transmission and may rely on wireless communication such as radio frequency communication (Wi-Fi, Bluetooth, 3G, 4G, etc.) and/or optical communication such as Li-Fi or FSO (infra-red IR, near infra-red NIR, short-wavelength infra-red SWIR, visible, etc.) and/or wire-communication (Ethernet, optical fiber). The server SERV may comprise one or more databases DB and/or it may be connected to one or more databases DB. The server SERV can be a communication server COM SERV and/or a lighting server LIGHT SERV.

"Transmitting data" can be performed by means known in the art. Data may be transmitted by wireless communication (RF, including Wi-Fi, Bluetooth, 3G, 4G; optical including Li-Fi or FSO) or by wire-communication (for example through an Ethernet cable, a USB port, optical fiber, etc.) from one entity to another. Optical communication may be preferred with respect to possible safety concerns. Indeed, use of optical communication such as by Li-Fi or FSO enables to limit exposure to certain types of waves (Wi-Fi, etc.) which may raise health issues. This is applies in particular to transmission of data to/from a head-mounted device, since such device is for wearing in the vicinity of the brain.

Data may be transmitted by access to and retrieval from a memory or database containing stored data (access and retrieval may be direct or indirect; conditional or not; etc.). Transmission of data may also be dependent on pre-defined access rights, and/or the detected presence in the vicinity of a given terminal (sensor/s).

Figure 6:
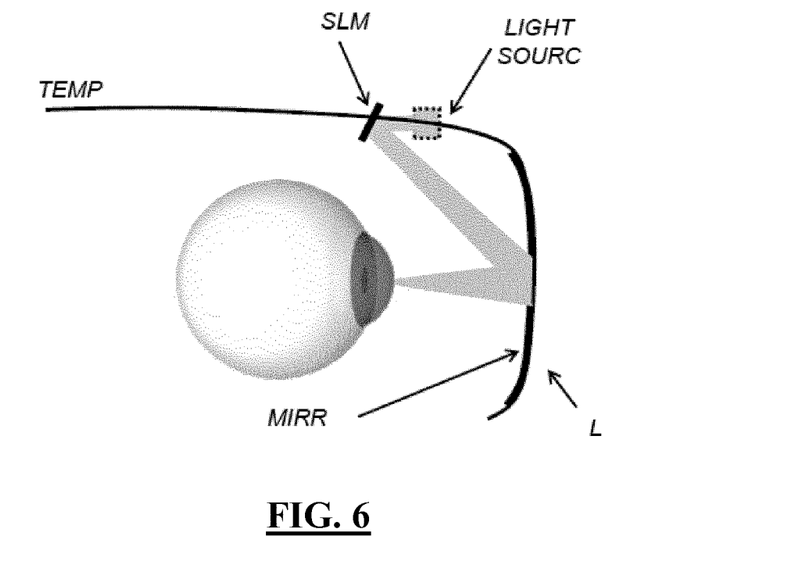
FIGS. 6-8 show exemplary structures for head-mounted devices of the invention.
Figure 7:
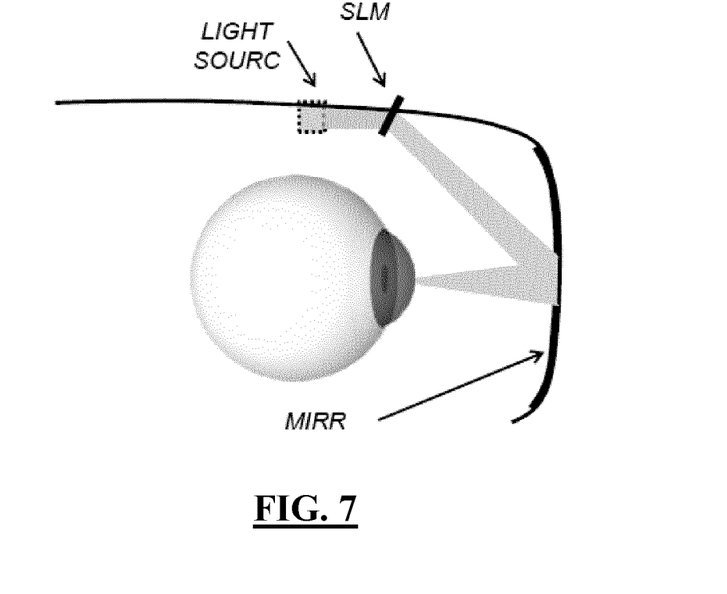
Figure 8:
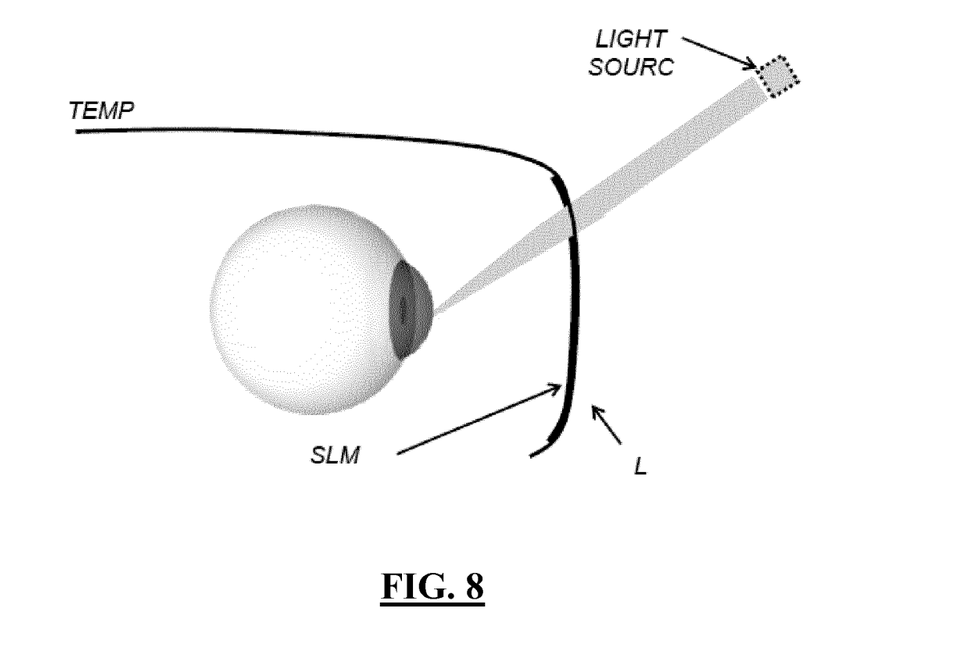

"Head-mounted display devices" (HMD) are known in the art. Such devices are to be worn on or about the head of a wearer, including helmet-mounted displays, optical head-mounted displays, head-worn displays and the like. They include optical means for displaying an image for visualization by the wearer. The HMD may provide for the display of a computer-generated image only, or for the superimposed visualization of a computer generated image and of a 'real-life' vision field. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from prescription lenses. According to the invention, the HMD comprises a spatial light modulator (SLM). In preferred embodiments, the HMD is a pair of eyeglasses provided with lenses. Examples of devices HMD of the invention are illustrated at FIGS. 6-8.

"Spatial light modulators" (SLM) are known in the art. Said SLM can be a phase SLM, a phase-only SLM, an amplitude-only SLM, or a phase and amplitude SLM. Where present, the amplitude modulation is preferably independent from the phase modulation, and allows for a reduction in the image speckle, so as to improve image quality in terms of levels of grays. In preferred embodiments, the SLM is a phase or a phase-only SLM. According to the invention, said SLM may be:

a reflective SLM (the light beam that causes the display is reflected on the SLM). Examples thereof include SLMs made of LCoS material (Liquid Crystal on Silicon). Possible commercial sources include Holoeye, Boulder Nonlinear Systems, Syndiant, Cambridge technologies. A device HMD of the invention comprising a reflective SLM, further comprises a holographic mirror; or a transmissive SLM (the light beam that causes the display is transmitted through the SLM). Preferably, the transmissive SLM is a "see-through" or "transparent" SLM, namely an SLM with a transmission rate of >85% or >90%. Such "see-through" SLM can advantageously be directly placed before a wearer eye, without otherwise impairing vision. Examples thereof include transparent active matrices made of thinned silicon on a glass (SOI: silicon on Insulator) or sapphire substrate or Glass transmissive Active Matrix Liquid Crystal. Such products are developed by Citizen Finetech Miyota. Other examples include LCD-type transparent active matrices such as amorphous silicon, IGZO, etc. Examples of possible commercial sources include Boulder Nonlinear Systems. A device HMD of the invention comprising a transmissive SLM may or may not comprise a holographic mirror.

The SLM preferably has one or more, preferably all, of the following features:

a pixel size of <10 µm, preferably <5 µm or <4 µm. It is preferred to select SLMs with small pixel sizes, so as to have spaced-apart diffraction orders, which are easy to select/pick, and so as to offer a suitable (arranged, configured) spatial sampling of the phase, yielding an image with higher resolution and better reproduction of the details thereof. Further, a smaller pixel size provides the possibility of images of wider fields, since the diffraction angles are larger.

a diffraction efficacy of >85%, preferably >90%. This is desirable because it provides for improved dynamics (response) and a suitable (arranged, configured) sampling of the phase of a single pixel;

an invisible command matrix and hardware (to pilot pixels);

phase dynamics of >2π;

phase sampling of 16 levels or more (4 bits);

fill factor (pixel useful area) of >90%, preferably >95%.

According to the invention, phase SLMs are advantageous in that they allow for the display of images whose image data are phase-coded. Phase-coding lowers the energy required for a given display of image (no intensity loss as compared to amplitude-only-modulation coding). Correspondingly, the energy consumption of the HMD can be advantageously reduced due to lesser computation resource requirements. However, it is also advantageous that the SLM also allows for amplitude modulation, since it provides for improved image quality, even though in that case computation may require more resources and hence consume more energy. This enables the use of smaller batteries, and thus reduces the bulk of the HMD and extends the energy autonomy of the device. According to the invention, the SLM acts as a 'programmable' hologram, namely an electronically addressable reading support that allows the display of the desired holographic image.

"Light sources" LIGHT SOURC are known in the art. According to the invention, a light source LIGHT SOURC is any light source that can emit a light beam suitable (arranged, configured) for displaying the image for visualization by the wearer. Regarding display of holographic images, the light beam comprises the reference beam for the hologram. The image can be displayed from the modified computer-generated image data (for example, modified computer-generated holographic image data) upon illumination of said HMD device by said light source LIGHT SOURC. The light source LIGHT SOURC is at least partially coherent, preferably quasi or fully coherent (spatially and spectrally). Coherence of the light generally results from the stimulated emission in an active medium within a resonance cavity. Coherence may be only partial due to the spontaneous emission of some media that are used for stimulated emission. Examples of coherent sources include lasers and narrow-spectrum laser diodes. Examples of partially coherent sources include certain laser diodes, modulated laser diodes, S-LEDs, some LEDs. Further examples are described in EP 0 421 460 B1. Preferably according to the invention, the light source LIGHT SOURC can be almost fully coherent (quasi-coherent), so as to suppress speckle effects resulting from perfect coherence.

According to the invention, the light source LIGHT SOURC may be monochromatic or polychromatic, for example tri-chromatic. For monochromatic use, it is preferred that the light beam emitted for image display comprises green light (wavelengths of about 500-560 nm). Green light is advantageous in that a lower energy (for example <1 mW) is required since the human retina is more sensitive to wavelengths in this range. Examples of monochromatic light sources with emission at about 520-550 nm include class 2 lasers, lasers at 532 nm, laser diodes at 520 nm (for example from Osram or Nichia), LED emitting at around 550 nm, etc. Preferably, the power of the monochromatic source is <10 mW. Other suitable monochromatic light sources include red: 615-645 nm; green: 520-550 nm; blue: 435-465 nm. For polychromatic use, it is preferred to use wavelengths (red, green, blue) close the standards used in imaging (red: 615-645 nm; green: 520-550 nm; blue: 435-465 nm). When three distinct sources are used (red, green, blue), each of said sources preferably has a power of <1 mW. Examples of polychromatic light sources include lasers, laser diodes, LEDs or S-LEDs. Preferably, at least three, preferably four or five different emission wavelengths may be used in combination so as to improve chromatic quality.

In preferred embodiments, in order to avoid noise resulting from certain external light sources (natural light, other LEDs in the wearer environment . . . ), the light source LIGHT SOURC of the invention may be synchronized with a specific frequency tied to the device, similarly to synchronous detection. Said frequency is preferably much higher than the Flicker frequency so as to avoid making image modulation visible. Such synchronizing is then required between the light source LIGHT SOURC and the image displayed by the device HMD. In some embodiments, there are thus two synchronizing stages: identification of the illumination light source LIGHT SOURC to avoid unwanted interaction with parasite light sources, and modulation for displaying the right image at the right color.

The illumination need not be directional, as long as a suitable (arranged, configured) light beam can illuminate the device HMD (and its SLM) to cause the desired display. According to the invention, said light source LIGHT SOURC may be provided on a lighting terminal LIGHT TERM and/or may be built-in on said HMD device. In one embodiment, the light source LIGHT SOURC is provided on a remote lighting terminal LIGHT TERM, namely a terminal distinct over the HMD. Said lighting terminal LIGHT TERM may or not be connected to a server SERV via a network NETW. When provided on a lighting terminal LIGHT TERM, the light source LIGHT SOURC may be divergent. The emission of a light beam by the light source LIGHT SOURC does not disturb the visual environment of the people in the vicinity of the lighting terminal LIGHT TERM, irrespective of whether said people are provided with a device HMD. Further, the use of a divergent, low power (about <100 mW) light source LIGHT SOURC is advantageous is terms of eye safety, since an HMD wearer and an HMD non-wearer are not endangered by the use of a laser.

According to the invention, it is preferred that said light source LIGHT SOURC is also suitable (arranged, configured) for transmitting data. A preferred embodiment includes a light source LIGHT SOURC that is suitable (arranged, configured) for both causing the display of the image by illumination and for transmitting data. When transmitting data, the light source LIGHT SOURC can emit said data by way of optical communication (visible), for example by Li-Fi communication. Said data can be computer-generated image data (modified or not, ID or MID), computer-generated holographic image data (modified or not MHD or HD) or VPD such as PD. The data can be sequentially emitted, for example with a modulation higher than the Flicker frequency, notably at a frequency of 75 Hz or more or 80 Hz or more. Such frequencies are not perceived by the human eye and the light beam for image display does not interfere with vision in 'real-life'.

"Terminals" TERM are known in the art. According to the invention, terminals TERM include lighting terminals LIGHT TERM and communication terminals COM TERM. A terminal TERM may simultaneously be a communication- and a lighting-terminal. This would be the case where, advantageously according to the invention, the light source LIGHT SOURC is also suitable (arranged, configured) for transmitting data to the HMD. Terminals include terminal with fixed geographic coordinates or fixed GPS coordinates and terminals with non-fixed geographic coordinates or non-fixed GPS coordinates. Terminals with fixed geographic or GPS coordinates include terminals located in train stations, metro stations, museums, airports, at traffic lights, etc. Terminals with non-fixed GPS include smartphones, tablets, boxes embarked on a vehicle, TV set top boxes, internet set top boxes, computers, etc. In some embodiments, the terminal is other than a smartphone and/or other than a tablet. The terminal may be portable or not. The terminal may be either stand-alone or connected to a network.

DETAILED DESCRIPTION OF THE DRAWINGS

The present invention provides methods and systems (terminals, devices) for the generation, the retrieval and the display of computer-generated holographic images through a head-mounted display. The holographic images may be used as retrievable virtual tags for display in augmented reality.

Methods of the Invention

The present invention provides methods for processing computer-generated holographic image data. The data are processed in that they can be generated or retrieved for subsequent display of the holographic image.

The present invention provides a computer-implemented method for the processing of computer-generated holographic image data, comprising:

(a) a step of detecting, by at least one communication terminal COM TERM, the presence of a wearer provided with a head-mounted computer-generated holographic image displaying device HMD; and (b) responsive to the presence detected at step (a), a step of transmitting computer-generated holographic image data HD from one of said device HMD and said communication terminal COM TERM, to the other of said device HMD and said communication terminal COM TERM.

Step (b) is step of transmitting data HD. The transmission of data HD may occur in two 'directions': either from the device HMD to the terminal COM TERM; or from the terminal COM TERM to the device HMD.

Figure 1:
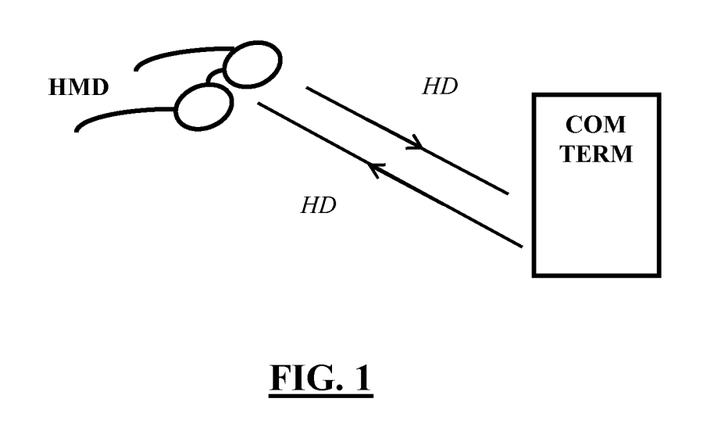
FIGS. 1-4 shows embodiments of the methods of the invention.

This is illustrated by FIG. 1, wherein the transmission of data HD is shown from the device HMD to the terminal COM TERM, and vice-versa. The communication terminal COM TERM may or may not be connected to a server via a network: the terminal COM TERM may be a stand-alone terminal or a network-connected terminal.

When step (b) comprises transmitting data HD from the device HMD to the terminal COM TERM, the method is suitable (arranged, configured) for generating a 'retrievable' holographic image. Indeed data HD are transmitted and can be stored on a memory, whether on the terminal COM TERM or on a database of a server connected to said terminal. Possible applications include the creation of holographic image tags which can be subsequently made available, for example by being 'pinned' at a given location, for retrieval and display by the same wearer and/or by other wearers.

When step (b) comprises transmitting data HD from the terminal COM TERM to the device HMD, the method is suitable (arranged, configured) for the retrieval of data for display of the holographic image. Possible applications include the retrieval of holographic images such as tags or contents, possibly in connection with a given location. For example, the holographic image tags may provide information such as text or pictures that are of relevance for a HMD wearer situated at the vicinity of a given location. The location is provided with a terminal, and the terminal offers the wearer the option of retrieving and displaying such tags 'pinned' at the location of the terminal.

Preferably according to the invention, step (b) may comprise transmitting said computer-generated holographic image data HD through optical communication, including Li-Fi, or FSO or by wire-communication (for example trough an Ethernet cable, a USB port, optical fiber, etc.) from one entity to another. This is advantageous in terms of safety concerns as explained above.

In another aspect, the invention provides a computer-implemented method for the display of computer-generated holographic images with a head-mounted computer-generated holographic image displaying device HMD worn by a wearer. The display of the holographic image is then visible by the wearer. Said method comprises steps (a) and (b) as described herein and further comprises (c) a step of emitting, by at least one light source LIGHT SOURC, a light beam suitable (arranged, configured) for displaying the holographic image by illumination of said device HMD. For an HMD with an SLM, step (c) thus comprises a step of illuminating the SLM with the light source LIGHT SOURC.

In some embodiments, said light source LIGHT SOURC is provided on a remote lighting terminal LIGHT TERM. In other embodiments, said light source LIGHT SOURC is built-in on said device HMD. In some embodiments, a light source LIGHT SOURC is provided on a remote lighting terminal LIGHT TERM and a light source LIGHT SOURC is built-in on said device HMD.

Advantageously according to the invention, when the light source LIGHT SOURC is provided an external terminal TERM (remote terminal, distinct over the HMD), the light source is 'fixed' in that it has, at least momentarily, constant geographic or GPS coordinates. Thus, it is possible to 'set' the image, and the image remains 'attached' to the light source LIGHT SOURC, for example a terminal TERM located near a given painting in a museum. This is advantageous in that there is no requirement for an eye tracker and for further calculations to 'attach' the image to the painting, even if the wearer turns the head.

According to the invention, the light source LIGHT SOURC may emit light in a multiplex mode. The multiplex mode may be spatial or temporal. The multiplexing may also involve emitting light for display by a plurality of devices HMD. In a museum example, a single light source LIGHT SOURC can emit for the benefit of several visitors simultaneously.

According to the invention, said light source LIGHT SOURC can be provided on said communication terminal COM TERM. Accordingly, step (b) may comprise transmitting said computer-generated holographic image data HD from said light source LIGHT SOURC to said device HMD. Step (b) can thus be performed by optical communication, which is advantageous as explained above.

Further, according to the invention, said at least one communication terminal COM TERM may (or may not) be connected to a server COM SERV via a network COM SERV; and/or said at least one lighting terminal LIGHT TERM may (or may not) be connected to a server LIGHT SERV via a network LIGHT SERV. Servers are advantageous in that they allow for updates of data. Servers may comprise one or more databases, and/or be connected to one or more databases.

Methods for 'Retrieving' and Displaying a Holographic Image (Reading a Tag)

In a first embodiment, the present invention provides methods for retrieving suitable (arranged, configured) data for the display of computer-generated holographic images. The data may be tied to a specific location, so as to 'tag' or 'flag' information, pictures and the like, to that specific location. The location need not be of fixed GPS coordinates.

In this embodiment, step (b) may be a step of transmitting said computer-generated holographic image data HD from said communication terminal COM TERM to said device HMD. The transmission may be 'push' or 'pull' from the wearer point of view, namely either irrespective of any command from the wearer, or triggered by an active command of the wearer.

In other terms, according to this embodiment, the light source is both suitable (arranged, configured) to display a computer-generated holographic image (replay the image by providing a suitable (arranged, configured) light beam; and suitable (arranged, configured) for transmitting said computer-generated holographic image data HD from said a (remote) communication terminal COM TERM to said device HMD. This dual role is particularly advantageous, in that it provides for image display on HMD devices, even if said HMD devices do not comprise their own light source. Further, it relies on a dual role of a communication terminal COM TERM that can transmit image data and, advantageously immediately thereafter, can cause display of the image by providing an illumination with a light beam suitable (arranged, configured).

Figure 2:
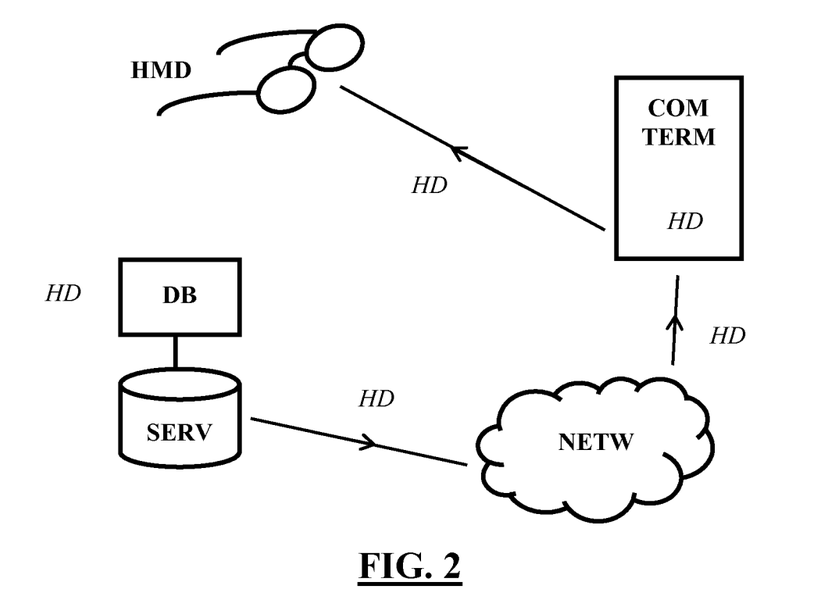

According to this embodiment, the data of step (b) may be stored on a memory on said terminal COM TERM (FIG. 1), or be stored in a database DB connected to the terminal COM TERM via a network NETW (FIG. 2). The database DB may comprise sets of data, wherein each set of data correspond to a given content (text, image, etc.). According to this first embodiment, the data HD of step (b) may correspond to an actual content (text, image, etc.), or the data HD of step (b) may comprise data for displaying a menu of options for further selection of contents. Correspondingly, the step (c) for display can either be a step for displaying content, or a step for displaying a menu of options for offering access to contents, etc.

Figure 3:
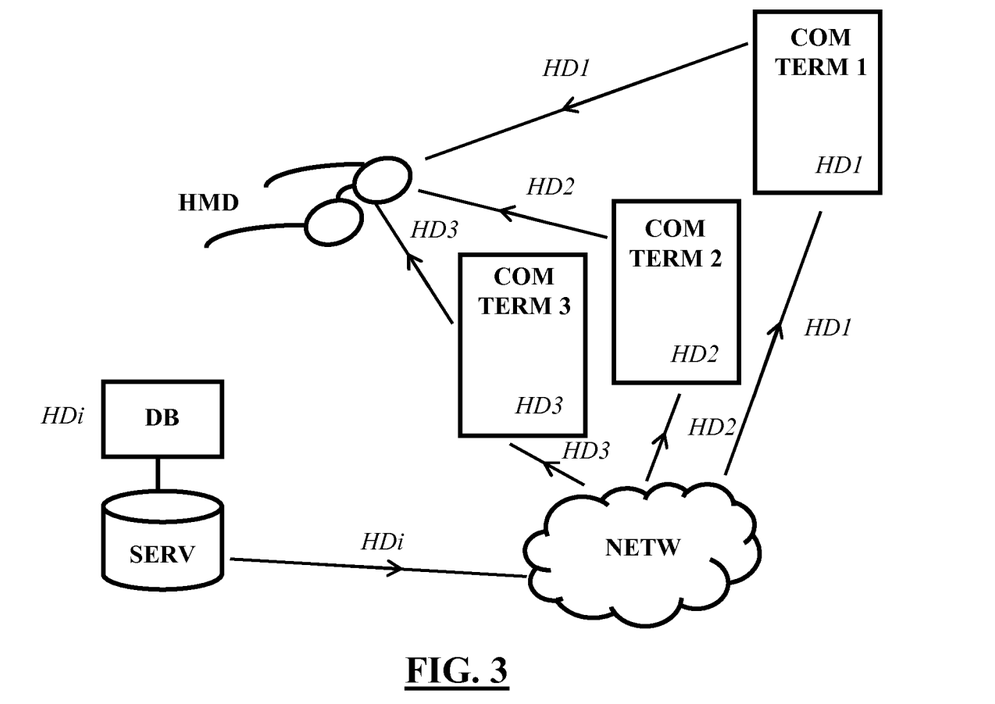

According to this first embodiment, the method may comprise the sequential retrieval and display of successive computer-generated holographic images (contents, tags). Thus, in this first embodiment, step (b) may comprise the step of sequentially transmitting computer-generated holographic image data HD from a plurality of distant communication terminals COM TERM i to said device, wherein each of said communication terminals COM TERM i is connected to a communication server COM SERV via a communication network COM NETW and wherein the sequential emission reflects the successive detection steps of the presence of the wearer from the vicinity of one communication terminal COM TERM i to the vicinity of another communication terminal COM TERM j, defining a movement of said wearer as a function of time. Such step (b) enables the successive display, sequentially in time, of a series of computer-generated holographic images (contents, tags). The communication network allows the synchronization of the various terminals (timing) and/or of the contents of the tags sequentially retrieved and displayed. This is illustrated by FIG. 3 showing plurality of terminals COM TERM 1,2,3. They are each connected to a server SERV via a network NETW. The network NETW comprises a database DB suitable (arranged, configured) for the storing and retrieval of data HD i (HD 1,2,3). Data HD i can be transmitted from the database DB to the terminal COM TERM i and then to the device HMD. The wearer may for example walk or drive along the sequence of terminals TERM 1,2,3. Data HD 1,2,3 are then sequentially and respectively transmitted from terminals COM TERM 1,2,3 to the device HMD. The wearer may then visualize the successive display of holographic image contents HOLO 1,2,3 corresponding to the data HD 1,2,3. This example comprises three terminals, but the skilled person understands that this is not limitative and that the method of the invention can be performed with a plurality of any number of terminals COM TERM.

Still according to this first embodiment, the method of the invention may further comprise (a2) a step of determining the location of said wearer, wherein the computer-generated holographic image data HD of step (b) are defined according to the location determined at step (a2). The location of a wearer may be determined in an absolute manner, for example by way of GPS coordinates, or in a relative manner, for example in the vicinity of a given terminal COM TERM. The relative location may be near a landmark such as a given painting in a museum, near a given metro station, at the entrance of a given tourist attraction. The data of step (b) are then advantageously defined according to the determined location, and allow the wearer to retrieve relevant information about the determined location. For example, holographic images (contents, tags) that may be retrieved for display include respectively information on the given painting in the museum (name of painter, date of painting, title of painting, etc.); local map around the metro station and signs for major directions; information about the nearest restaurant or ATM.

Still according to this first embodiment, the method of the invention may further comprise the possibility to retrieve on demand data for a holographic images selected from several options, such as from a menu. The method of the invention may further comprise (d) a step of detecting a movement of the wearer, and (e) as a function of the recognition of the movement of step (d), a step of generating a control signal for the selection of further computer-generated holographic image data HD to be transmitted from said communication terminal COM TERM to said device HMD. The step (d) of detecting a movement may be a step of detecting by the device HMD or by the terminal COM TERM. The movement may be any suitable (arranged, configured) movement for generating a command/control signal. Such movements include any haptic command movements such as pushing a button, making a hand-, head-, vocal- or eye-motion, and the like. The control signal of step (e) allows the selection of options, including a selection from a menu, a drop down menu, a selection from one key on a virtual keyboard, a selection by hand-writing on a virtual pad, etc.

Methods for Creating a Holographic Image and Generating a 'Tag'

In a second embodiment, the present invention also provides a method for creating a holographic image (tag/content). Said holographic image may then subsequently be retrieved and displayed. The holographic image may also be associated with a given location, so that the invention also provides a method for tagging with a holographic image.

According to this second embodiment, the present invention thus provides a method comprising steps (a) and (b), wherein step (b) is a step of transmitting computer-generated holographic image data HD from said device towards said communication terminal COM TERM. Advantageously, this embodiment allows to generate data that may subsequently be transmitted to a terminal, wherein said data are then subsequently be made available for further retrieval and display. The HMD may not only act as a 'receiver', it can also act as an 'emitter' of image data.

In this second embodiment, the method may comprise optional step (c) as described herein. The method may also comprises (i) a step of detecting a movement of a wearer provided with a head-mounted computer-generated holographic image displaying device HMD, and (ii) as a function of the recognition of the movement of step (i), a step of acquiring data, such as image data. The movement of step (i) can be any movement suitable (arranged, configured) for generating a control signal for command, and include the movements as described above for step (d).

The step of acquiring data comprises obtaining data as a function of the recognition of the movement of step (i). The data can be image data, such as picture data, text data. Said image data can then be converted into computer-generated image data. The conversion may be performed by a processor built-in on the HMD, or on a communication terminal.

The step (ii) of acquiring data may comprise one or more selected from selecting an option from a menu, hitting at least one key on a virtual keyboard, hand-writing on a virtual note pad, giving instructions by vocal command, taking a digital picture or recording a digital video, pushing a button placed on the HMD and combinations thereof. The data of step (ii) may thus be data for text, pictures, combinations thereof, etc. The invention may thus provide for virtual posts, which are computer-generated holographic image tags with content. The step (ii) may also be a step of virtually annotating, for example by virtual clicking (selection from a pre-defined menu or predefined icons, such as selection of a virtual button 'Like!') or virtual hand-writing, which may be recognized and converted into digital text.

Figure 4:
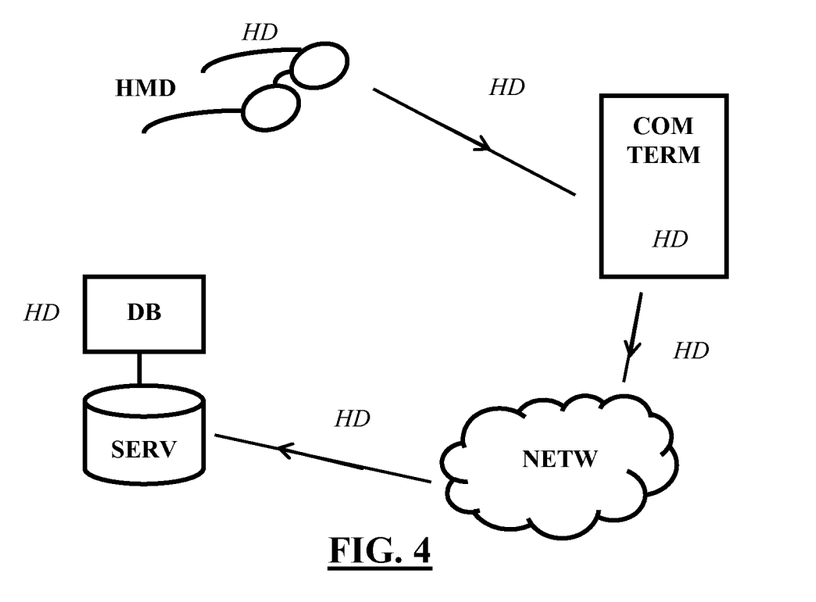

Again, the communication terminal may or may not be connected to a server via a network. In the method of the invention, step (ii) may be performed without connection to a server. Alternatively said at least one communication terminal COM TERM may be connected to a communication server COM SERV via a network COM NETW and the data of step (b) can stored in a communication database COM DB (as illustrated by FIG. 4), optionally in association with a location. The association of the transmitted data with a given location allows the option of pinning a tag, namely of associating a computer-generated holographic image (content) with a specific location. For example, customer reviews of a restaurant may be made available on a terminal situated in the vicinity of said restaurant. The location associated with the data may or may not be the location of the wearer: the location may be that of the wearer when the wearer is present in the vicinity of the terminal, but it is also possible for the wearer to provide the association between the data and the location at a time when the wearer is no longer at the location of interest, for example by providing the data to the server via a network using another terminal.

Methods with Predefined Access Rights

The present invention also provides options for defining wearer profiles and access rights. The definition of wearer profiles is useful to provide selected information of relevance for a given wearer. For example, if the wearer is interested sports, specific contents in relation to sports may be made available for said wearer for visualization. Access rights may be defined for the retrieval of holographic image data (restricted access for visualizing a tag or content) and/or for the creation of a holographic image (restricted access for generating a tag or content).

The method of the invention may further comprise (a1) a preliminary step of pre-registering, in a database, an association between an identifier ID and said wearer, wherein the data of step (b) are defined according to said identifier ID, optionally in accordance with access rights.

The identifier ID may be any suitable (arranged, configured) identifier. It may be a code such as a QR code or an RFID, for example located on, the device HMD. The identifier allows the definition of a wearer profile, which may reflect wearer's field of interests, habits, etc. The identifier may also be used to define access rights. The access rights may be defined by setting one or more levels of access (public, semi-public, confidential, etc.), in terms of data retrieval (displaying a tag) and/or data creation (generating a tag). The access rights may be stored in a dedicated database, for example a wearer database. The database may be provided on a terminal and/or on a server connected to the terminal.

Systems and Devices of the Invention

In another aspect, the present invention provides systems, including lighting terminals LIGHT TERM and devices HMD. Said systems are suitable (arranged, configured) for performing the method of the invention.

The present invention provides a lighting terminal LIGHT TERM. This terminal is suitable for the implementation of the method of the invention.

The light terminal LIGHT TERM of the invention comprises:
  a light source LIGHT SOURC suitable (arranged, configured) for displaying a holographic image by illumination,
  a sensor LIGHT SENS suitable (arranged, configured) for detecting the presence of a wearer provided with a head-mounted computer-generated holographic image displaying device HMD, and
  optionally, a communication interface LIGHT INT suitable (arranged, configured) for transmitting computer-generated holographic image data from and/or to said lighting terminal LIGHT TERM.

The light terminal may or may not be connected to a network (stand-alone or network connected terminal).

The presence of the wearer may be detected by means known in the art, for example by any suitable (arranged, configured) identifier. Suitable (arranged, configured) identifiers include codes such as QR codes or RFID. The identifier may be provided on the device HMD. It may also be a modulation frequency specific to the HMD (and the wearer). It may be an optical signature.

The communication interface NT may include a USB port and/or any other interface for wireless communication, including radiofrequency such as Bluetooth, Wi-Fi, 4G, 3G; optical (Li-Fi or FSO) and/or IR communication; and/or a photodiode (for receiving data) and/or an emitter, for example a visible or near IR light source (for emitting data). Further, the light terminal LIGHT TERM may comprise one or more of the following:
  a battery or any other power means,
  a GPS for determining GPS coordinates,
  one memory or a plurality of memories,
  a digital camera,
  other sensors,
  a controller CONT suitable (arranged, configured) for processing holographic image data (modified or not).

Said controller CONT is suitable (arranged, configured) for performing step (iii) and comprises a processor.

In a preferred embodiment, in the lighting terminal LIGHT TERM of the invention, said light source LIGHT SOURC is further suitable (arranged, configured) for transmitting computer-generated holographic image data HD from said lighting terminal LIGHT TERM. Optical communication is very advantageous as explained above.

The invention also pertains to a deployed network of lighting terminals as described herein. The invention thus relates to a system comprising a plurality of lighting terminals LIGHT TERM as described herein, wherein each of said lighting terminals LIGHT TERM is connected to a lighting server LIGHT SERV via a lighting network LIGHT NETW.

The invention also pertains to a head-mounted device. Said device is suitable (arranged, configured) for implementing the method of the invention. The invention provides a head-mounted computer-generated holographic image displaying device comprising:

- a communication interface µINT suitable (arranged, configured) for transmitting computer-generated holographic image data HD from and/or to said device,
- a phase spatial light modulator SLM, for example a phase-only or a phase and amplitude spatial light modulator, for example made of LCoS (liquid crystal on silicon) or Glass transmissive Active Matrix Liquid Crystal, and
- optionally, a light source LIGHT SOURC suitable (arranged, configured) for displaying a holographic image by illumination.

This device HMD is suitable (arranged, configured) for implementing the method of the present invention.

In a preferred embodiment, said device HMD is a pair of prescription eyeglasses with a phase SLM.

Preferably, the computer-generated image is a computer-generated holographic image.

The SLM is preferably a phase SLM, for example phase-only, and can be made of LCoS; or Glass transmissive Active Matrix Liquid Crystal. The SLM may also be a "see-through" SLM provided before the wearer eye, in which case no holographic mirror is required. When the SLM is provided elsewhere than before the wearer eye, for example when the SLM is provided on the side of the device HMD or near the wearer temple, then a holographic mirror may be required.

According to the invention, the device HMD may comprise one or more of the following:

- at least one lens, wherein said lens is provided with an anti-reflection coating and optionally a holographic mirror provided on or within the lens on the side of the wearer; the holographic mirror is preferably present when the device HMD is provided with a built-in light source LIGHT SOURC,
- the lens may be part of a pair of prescription lenses,
- a battery,
- a GPS,
- at least one memory,
- a camera,
- a microphone,
- sensors, for example an eye tracker, a movement tracker or haptic means, including haptic command means,
- a micro-controller (µCONT) suitable (arranged, configured) for processing (decoding, demodulating, coding, etc.) image data. Said controller CONT may be suitable (arranged, configured) for performing step (iii) and comprise a processor.

The communication interface µINT may include a USB port and/or any other interface for wireless communication, including radiofrequency such as Bluetooth, Wi-Fi, 4G, 3G; optical (Li-Fi, FSO) and/or IR communication; and/or a photodiode (for receiving data) and/or an emitter, for example a visible or near IR light source (for emitting data).

The device HMD may comprise a memory suitable (arranged, configured) for storing data selected from visualization parameter data VPD, computer-generated image data ID and modified computer-generated image data MID. The programming of the device HMD may include inputting data selected from visualization parameter data VPD, computer-generated image data ID and modified computer-generated image data MID.

Examples of devices HMD of the invention are illustrated on FIGS. 6-8. These examples are devices comprising a light source LIGHT SOURC mounted on a temple TEMP of the device, although the presence of said light source LIGHT SOURC is optional according to the invention.

The device HMD comprises a spatial light modulator SLM and a lens L.

The SLM may be located on a temple TEMP of the device HMD. The SLM may function in reflection (FIG. 6) or in transmission (FIG. 7). The light beam emitted by the light source LIGHT SOURC is respectively reflected (FIG. 6) or transmitted (FIGS. 7-8) by the SLM, before hitting the lens L. Where the device HMD of the invention comprises a reflective SLM, the device HMD further comprises a holographic mirror. The lens L is provided with a holographic mirror MIRR on the side of the lens L facing the eye of the wearer. The lens L is also provided with an anti-reflection coating. After reflection on the holographic mirror MIRR, the light beam is directed to the wearer eye, thus causing visualization of the holographic image. The holographic mirror MIRR is off-center.

Holographic mirrors are known in the art, part of optical holography elements. They can for example comprise a diffraction grating of set fringes. The holographic mirror may be made of photopolymers of dichromated gelatins or synthetic photopolymers known in the art or bleached silver holographic emulsions. Advantageously, the holographic mirror MIRR can be combined with the lens without affecting the geometry of the lens. As a consequence, the optical function of the lens and the optical function of the holographic mirror are completely de-correlated and can be optimized independently. The holographic mirror may be designed so as to correct for some or all of the optical aberrations of the system (notably since the SLM is located on a glass temple TEMP as on FIGS. 6-7, it is off-center, which gives rise to optical aberrations in the image as visualized by the wearer). The holographic mirror may be manufactured angular fraction by angular fraction so as to limit field aberrations (reduced aperture). In such case, the mirror reflects the light in the desired wavelength(s) only for the incident light in a given direction. Such mirrors are especially advantageous for devices HMD provided with a built-in light source LIGHT SOURC. For constructing an image with larger aperture, it is possible to fragment the overall image and proceed with a scanning of the mirror by the beam.

The SLM may also be a "see-through" transmissive SLM as shown on FIG. 8. A remote light source LIGHT SOURC emits a beam that is transmitted through the lens L and the SLM to reach the wearer's eye.

For monochromatic use, the holographic mirror is optically recorded (defined) at the wavelength of illumination. For wavelength other than this wavelength, the mirror is transparent and thus does not impair vision by the wearer through the lens. For tri-chromatic use (red, green, blue), the holographic mirror is optically recorded (defined) at three wavelengths and the holographic image can be visualized in the three wavelengths considered. The holographic mirror is transparent at the other wavelengths. Similarly, for wavelengths other than the three selected wavelengths, the mirror is transparent and thus does not impair vision by the wearer through the lens (diffraction efficacy is nil). Preferably, the mirror is optically recorded for various angles of illumination (incident light).

The design and setup of the holographic mirror is common knowledge for the skilled person.

The devices HMD of the invention are advantageous in that they protect confidentiality of the images visualized by the wearer wearing the device HMD, because the mirror is specific to the wavelength(s) used for illumination and visualization.

When the SLM is provided on a temple of the glasses/HMD, it is obviously off-center, and thus the projection of the holographic image by the SLM creates visual/optical aberrations, which can advantageously be at least partially compensated by a suitable (arranged, configured) modification of the holographic image data. The SLM thus modifies the wave front emitted (transmitted or reflected) by the SLM accordingly, leading to improved visual experience and comfort.

The present invention also pertains to the use of an SLM in a head-mounted device. More particularly, the invention pertains to the use of an SLM in eyeglasses, including prescription eyeglasses. The SLM can be a phase and/or amplitude spatial light modulator SLM, preferably a phase or phase-only SLM, for example an LCoS SLM or a Glass transmissive Active Matrix LC SLM.

The methods and systems of the present invention are useful for a number of applications: at home, in the kitchen, for example when cooking for displaying cooking instructions, user manuals of kitchen/home appliances; in the car, for example when driving for displaying directions or traffic information; in the living room, for example when watching TV for displaying TV program guides; in a shopping mall for displaying directions, advertising, information about special events, pricing information, product information; in touristic places, for displaying directions or information.

The invention is illustrated by the following non-limiting examples.

EXAMPLES

Example 1

Display of Information in an Airport

A wearer is provided with a device HMD of the invention. The wearer is in an airport for boarding a flight. The airport is equipped with a plurality of terminals of the invention. The terminals are deployed in the airport. Each terminal is provided with a light source that is suitable (arranged, configured) for both causing holographic image display on the device HMD and for transmitting data using Li-Fi communication. The wearer has a wearer profile that identifies the flight s/he is about to board, and may include other features. The profile is stored on a database connected to the terminals. A further database, also connected to the terminals, contains the relevant information about the flight, such as the departure gate, the time of gate closing, etc.

The wearer can retrieve and visualize information as computer-generated holographic images on the HMD. Such information may include flight information such as gate change for departure, expected delay, etc.; airport information, etc. Further, the wearer may retrieve and display directions to the gate of departure in the event where s/he is lost in the airport, the distance and/or approximate time required for walking from the wearer current location to the departure gate, etc. Further information may also be made available as a function of the wearer profile. For example, if the wearer is interested in literature, information may be made available for display regarding the nearest bookshop in the airport.

Example 2

Display of Information for Nearby Places of Interest

A wearer is provided with a device HMD of the invention. The wearer is in a touristic location. The location is provided with a communication terminal COM TERM as per the invention. The terminal detects the presence of the wearer, which causes the transmission of holographic image data HD from the terminal COM TERM to the device HMD. The data HD allow for the display of a menu comprising icons. The icons may include an icon for restaurants (for example, an image showing a plate with cutlery), an icon for ATMs (for example, the symbol € for euros or $ for dollars), an icon for shops (for example a basket or a shopping tote), etc. Using haptic means, for example virtual clicking, the wearer is able to select one of the icons. By selecting the € icon, a further display is provided with indications to locate the nearest ATMs in the vicinity of the terminal.

Example 3

Creating a Tag (Flag) for a Restaurant

A wearer is provided with a device HMD of the invention. A communication terminal COM TERM is located near a restaurant. The terminal is connected to a server SERV via a network NETW. The server is connected to a database DB. The database comprises a content database comprising holographic image data, as well as a wearer database comprising wearer profiles. The wearer is part of a gastronomy club, which is reflected by his/her wearer profile and pre-registered access rights.

The wearer has dinner in the restaurant and intends to post a review available to other members of the gastronomy club. The wearer may create contents corresponding to the review (picture of the plate, general comment on the meal) by acquiring data (picture, entry of text) using a camera and/or haptic means, for example by striking on a virtual keyboard. There are then two options. Either the wearer causes the transmission of holographic image data HD corresponding to the contents from the device HMD to the terminal COM TERM located near the restaurant. Or the wearer goes back home and causes the transmission of said data HD from a terminal at home. In both cases, the holographic image data HD can be uploaded from the respective terminals to the database via the server and the network.

The contents posted by the wearer are then made available to the other members of the gastronomy club, in accordance with pre-defined access rights for members of that club.

When arriving near the restaurant, another member of the club with suitable (arranged, configured) access rights may retrieve and display the contents (review) as created by the wearer.

The invention claimed is:

1. A computer-implemented method for the processing of computer-generated holographic coded image data including computer-generated holographic phase-coded image data, comprising:
   (a) a step of detecting, by at least one communication terminal, the presence of a wearer provided with a head-mounted computer-generated holographic image displaying device;
   (b) responsive to the presence detected at step (a), a step of transmitting computer-generated decoded holographic image data from the at least one communication terminal to the device, and
   (c) a step of emitting, by at least one light source, a light beam arranged for displaying the holographic image by illumination of the device, wherein the at least one light source is provided on the at least one communication terminal which is a remote lighting terminal,
   wherein step (a) is performed by a sensor of the at leak one communication terminal, which sensor is a haptic command, and
   wherein transmitting in step (b) the decoded computer-generated holographic image data from the at least one light source to the device is done before illuminating the device in step (c).

2. The computer-implemented method of claim 1, wherein
   step (b) comprises transmitting said decoded computer-generated holographic image data through optical communication.

3. The computer-implemented method of claim 1, wherein the at least one communication terminal is connected to a server via a network.

4. The computer-implemented method according to claim 1, wherein
   step (b) comprises sequentially transmitting decoded computer-generated holographic image data from a plurality of distant communication terminals to the device, wherein each of the at least one communication terminal is connected to a communication server via a communication network and wherein the sequential transmission reflects the successive detection steps of the presence of the wearer from the vicinity of the at least one communication terminal to the vicinity of another communication terminal, defining a movement of the wearer as a function of time.

5. The computer-implemented method according to claim 1 further comprising:
   (a1) a step of determining the location of the wearer, and wherein
   the computer-generated holographic image data of step (h) is defined according to the location determined at step (a1).

6. The computer-implemented method according to claim 1, further comprising:
   (d) a step of detecting a movement of the wearer, and
   (e) as a function of the recognition of the movement in step (d), a step of generating a control signal for the selection of further computer-generated holographic image data to be transmitted from the at least one communication terminal to the device.

7. The computer-implemented method according to claim 1, wherein said method further comprises:
   (a1) a preliminary step of pre-registering, in a database, an association between an identifier and the wearer, and wherein
   the data of step (b) is defined according to the identifier.

8. The computer-implemented method according to claim 7, wherein
   the data of step (b) is defined according to the identifier in accordance with access rights.

9. A system for displaying a computer-generated holographic image for a wearer of a head-mounted computer-generated holographic image displaying device, the system comprising:
   said head-mounted computer-generated holographic image displaying device; and
   at least one remote lighting terminal communicating with the head-mounted computer-generated holographic image displaying device and comprising:
   a light source;
   a sensor which is arranged for detecting the presence of a wearer provided with the device in the vicinity of the at least one remote lighting terminal and which is a haptic command; and
   a communication interface configured to transmit, to said at least one remote lighting terminal, decoded computer-generated phase-coded image data, upon detecting by the sensor of the presence of the wearer in the vicinity of the at least one remote lighting terminal,
   wherein said light source is arranged, responsive to the presence detected by said sensor, for transmitting decoded computer-generated holographic image data from said light source to said device and afterwards for emitting a light beam to illuminate said device so as to display the holographic image.

10. The system according to claim 9, further comprising:
    a communication interface arranged for transmitting the decoded computer-generated holographic image data to the device upon detecting by a sensor of the presence of the wearer in the vicinity of the at least one remote lighting terminal; and
    a phase spatial light modulator.

11. The system according to claim 10, wherein
    the phase spatial light modulator is made of LCoS (liquid crystal on silicon) or Glass transmissive Active Matrix Liquid Crystal.

12. The system according to claim 9, wherein
    the operation of the light source is synchronized with the display of the holographic image by the head-mounted computer-generated holographic image displaying device.

* * * * *